(12) United States Patent
Li

(10) Patent No.: US 12,457,055 B2
(45) Date of Patent: Oct. 28, 2025

(54) METHOD FOR TRANSPORTING DATA BLOCK, TERMINAL, BASE STATION AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 527 days.

(21) Appl. No.: 17/995,070

(22) PCT Filed: Mar. 31, 2020

(86) PCT No.: PCT/CN2020/082587
§ 371 (c)(1),
(2) Date: Sep. 29, 2022

(87) PCT Pub. No.: WO2021/196025
PCT Pub. Date: Oct. 7, 2021

(65) Prior Publication Data
US 2023/0179326 A1 Jun. 8, 2023

(51) Int. Cl.
*H04L 1/00* (2006.01)
*H04W 72/232* (2023.01)
(52) U.S. Cl.
CPC ............ *H04L 1/003* (2013.01); *H04L 1/0007* (2013.01); *H04W 72/232* (2023.01)
(58) Field of Classification Search
CPC ..... H04L 1/003; H04L 1/0007; H04L 5/0023; H04L 5/0046; H04L 5/0053; H04L 5/006; H04L 1/0003; H04L 1/0009; H04L 1/0015; H04L 1/0025; H04L 1/0026;
(Continued)

(56) References Cited

U.S. PATENT DOCUMENTS

2005/0120282 A1* 6/2005 Kim .......................... H04L 1/20
714/707
2005/0208973 A1* 9/2005 Iochi ..................... H04W 52/16
455/522
(Continued)

FOREIGN PATENT DOCUMENTS

CN 101034955 A 9/2007
CN 103516473 A 1/2014
(Continued)

OTHER PUBLICATIONS

"3rd Generation Partnership Project; Technical Specification Group Radio Access Network; NR; Physical layer procedures for data (Release 16), 5.1.3.2, and 6.1.4.2; Type-A," 3GPP TS 38.214 V16.0.0, Dec. 2019, 147 pages.

*Primary Examiner* — Kiet Tang
(74) *Attorney, Agent, or Firm* — McCoy Russell LLP

(57) ABSTRACT

A method for transporting data block includes: determining an initial transport block size (TBS) according to received current downlink control information (DCI); acquiring current first channel state information (CSI) and second channel state information (CSI) acquired last time; adjusting the initial TBS according to the first CSI and the second CSI to obtain an adjusted TBS; and sending, according to the adjusted TBS, uplink data corresponding to the current DCI to a base station.

19 Claims, 9 Drawing Sheets

(58) Field of Classification Search
CPC .... H04L 1/0031; H04W 72/232; H04W 4/70; H04W 72/23; H04W 72/542
See application file for complete search history.

(56) References Cited

U.S. PATENT DOCUMENTS

| | | | |
|---|---|---|---|
| 2006/0067229 A1* | 3/2006 | Frederiksen | H04L 1/0068 370/235 |
| 2019/0045390 A1* | 2/2019 | Davydov | H04W 28/10 |
| 2019/0349116 A1 | 11/2019 | Hosseini et al. | |
| 2020/0374920 A1* | 11/2020 | Tie | H04W 72/0446 |

FOREIGN PATENT DOCUMENTS

| | | |
|---|---|---|
| CN | 108282879 A | 7/2018 |
| CN | 109076389 A | 12/2018 |
| CN | 109392022 A | 2/2019 |
| CN | 109565361 A | 4/2019 |
| CN | 110178325 A | 8/2019 |
| CN | 110268655 A | 9/2019 |
| EP | 2942892 A1 | 11/2015 |

\* cited by examiner

METHOD FOR TRANSPORTING DATA BLOCK, TERMINAL, BASE STATION AND STORAGE MEDIUM

CROSS REFERENCE TO RELATED APPLICATION

The present application is a U.S. National Phase of International Application No. PCT/CN2020/082587 entitled "DATA BLOCK TRANSPORT METHOD AND APPARATUS, TERMINAL, BASE STATION AND STORAGE MEDIUM," and filed on Mar. 31, 2020. The entire contents of the above-listed application are hereby incorporated by reference for all purposes.

TECHNICAL FIELD

The disclosure relates to the technical field of mobile communications, in particular to a method for transporting data block, terminal, base station and storage medium.

BACKGROUND

Machine type communication (MTC) and narrow band Internet of Thing (NB-IoT), as representatives of cellular IoT, are widely used in data collection, intelligent transportation and other fields. Coverage is one of the key factors that operators consider when commercializing cellular networks.

Physical block uplink and downlink data sharing channels use transport blocks (TBs) as the basic unit for data transport. When user equipment (UE) determines a transport block size (TBS), a modulation method and a code rate are determined according to a modulation and coding scheme (MCS) level configured by a base station, then the transport data block size is determined according to a size of transported physical resources, and then the corresponding TBS is modulated, coded and so on.

SUMMARY

The disclosure provides a method for transporting data block, terminal, base station and storage medium.

According to a first aspect of the disclosure, a method for transporting data block is provided, and includes:
  determining, according to received current downlink control information (DCI), an initial transport block size (TBS);
  obtaining current first channel state information (CSI) and second CSI obtained last time;
  obtaining an adjusted TBS by adjusting, according to the first CSI and the second CSI, the initial TBS; and
  sending, according to the adjusted TBS, uplink data corresponding to the current DCI to a base station.

According to a second aspect of the disclosure, a method for transporting data block is provided, and includes:
  sending downlink control information (DCI) to user equipment;
  receiving an adjusted transport block size (TBS) sent by the user equipment, the adjusted TBS being obtained by the user equipment after adjusting, according to first channel state information (CSI) obtained currently and second channel state information (CSI) obtained last time, an initial TBS determined according to the DCI; and
  receiving, according to the adjusted TBS, uplink data sent by the user equipment, the uplink data corresponding to the DCI.

According to a third aspect of the disclosure, a method for transporting data block is provided, and includes:
  sending downlink control information (DCI) to user equipment;
  receiving, according to an initial TBS, uplink data sent by the user equipment, the initial TBS being determined according to the DCI; and
  obtaining each adjusted TBS by adjusting, in response to a failure to parse the uplink data, the initial TBS, and parsing, according to each adjusted TBS, the uplink data.

According to a fourth aspect of the disclosure, a terminal is provided, and includes:
  a processor;
  a transceiver connected to the processor; and
  a memory configured to store processor-executable instructions.
  The processor is configured to:
  determine, according to received current downlink control information (DCI), an initial transport block size (TBS);
  obtain current first channel state information (CSI) and second channel state information (CSI) obtained last time;
  obtain an adjusted TBS by adjusting, according to the first CSI and the second CSI, the initial TBS; and
  send, according to the adjusted TBS, uplink data corresponding to the current DCI to a base station.

According to a fifth aspect of the disclosure, a base station is provided, and includes:
  a processor;
  a transceiver connected to the processor; and
  a memory configured to store processor-executable instructions.
  The processor is configured to:
  send downlink control information (DCI) to user equipment;
  receive an adjusted transport block size (TBS) sent by the user equipment, the adjusted TBS being obtained by the user equipment after adjusting, according to first channel state information (CSI) obtained currently and second channel state information (CSI) obtained last time, an initial TBS determined according to the DCI; and
  receive, according to the adjusted TBS, uplink data sent by the user equipment, the uplink data corresponding to the DCI.

According to a sixth aspect of the disclosure, a base station is provided, and includes:
  a processor;
  a transceiver connected to the processor; and
  a memory configured to store processor-executable instructions.
  The processor is configured to:
  send downlink control information (DCI) to user equipment;
  receive, according to an initial TBS, uplink data sent by the user equipment, the initial TBS being determined according to the DCI; and
  obtain each adjusted TBS by adjusting, in response to a failure to parse the uplink data, the initial TBS, and parse, according to each adjusted TBS, the uplink data.

According to a seventh aspect of the disclosure, a non-transitory computer-readable storage medium is provided.

The computer-readable storage medium stores at least one instruction, at least one program, a code set or instruction set, and the at least one instruction, the at least one program, the code set or instruction set are loaded and executed by a processor to implement the method for transporting data block according to the first aspect or any optional scheme of the first aspect.

It should be understood that the above general descriptions and later detailed descriptions are merely illustrative, and cannot limit the disclosure.

Figure 1:
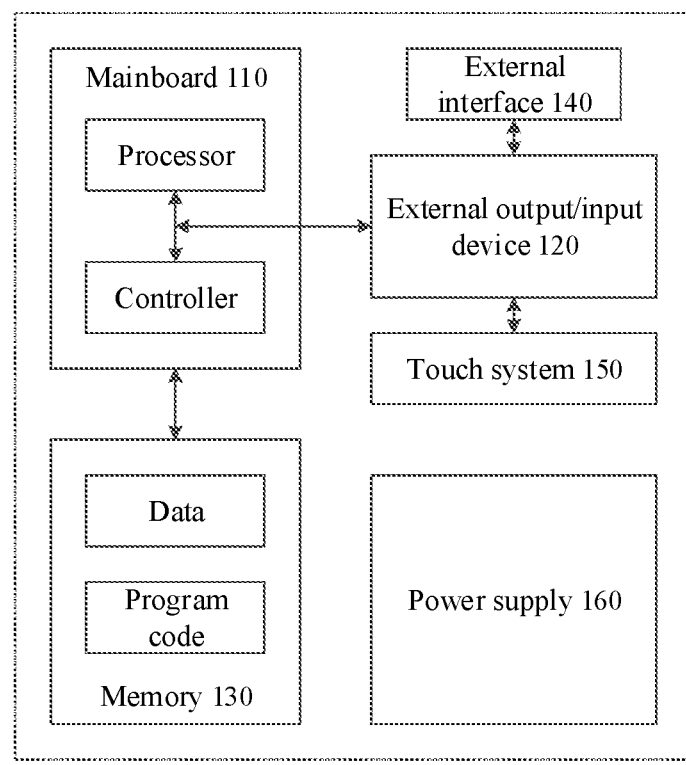
FIG. 1 illustrates a schematic structural diagram of user equipment provided by an example of the disclosure.

The accompanying drawings, which are incorporated in and constitute a part of the specification, illustrate examples consistent with the disclosure and together with the specification serve to explain the principles of the disclosure.

DETAILED DESCRIPTION

Examples will be described in detail here, instances of which are illustrated in the accompanying drawings. When the following description refers to the accompanying drawings, unless otherwise indicated, the same numbers in different accompanying drawings indicate the same or similar elements. The implementations described in the following examples do not represent all implementations consistent with the disclosure. Rather, they are merely instances of apparatuses and methods consistent with some aspects of the disclosure as detailed in the appended claims.

It should be understood that, as used herein, "several" refers to one or more, and "a plurality of" refers to two or more. "And/or" describes the association relationship of associated objects, which means that there can be three kinds of relationships. For example, A and/or B can mean that there are three kinds of cases: A alone, A and B at the same time, and B alone. The character "/" generally indicates that associated objects are in an "or" relationship.

Machine type communication (MTC) and narrow band Internet of Thing (NB-IoT), as representatives of cellular IoT, are widely used in data collection, intelligent transportation and other fields. Coverage is one of the key factors that operators consider when commercializing cellular networks.

Physical block uplink and downlink data sharing channels use transport blocks (TBs) as the basic unit for data transport. When user equipment (UE) determines a transport block size (TBS), a modulation method and a code rate are determined according to a modulation and coding scheme (MCS) level configured by a base station, then the transport data block size is determined according to a size of transported physical resources, and then the corresponding TBS is modulated, coded and so on.

Since the base station selects the MCS and the transported resources for a terminal based on a transport state reported by the user terminal before, when the terminal moves fast, the transport state reported previously may be different from a current transport state, especially when the terminal is on the edge of coverage, the difference may seriously affect the communication quality. In this way, how to adjust a control channel when the MCS level configured for the terminal by the base station does not match a current actual channel state of the terminal needs to be solved urgently.

The disclosure provides a method for transporting data block. The method for transporting data block is performed by a terminal, and proposes a solution to the problem of adjusting a control channel when the MCS level configured for the terminal by a base station does not match a current actual channel state of the terminal. The method for transporting data block involved in the example of the disclosure will be described in detail below with reference to the accompanying drawings.

First, some terms involved in the disclosure are explained.
(1) User Equipment (UE)

In 3G/4G systems such as long term evolution (LTE) of universal mobile communication technology, the terminal is referred to as UE. In the example of the disclosure, the user equipment may be a mobile phone, a smart terminal, a multimedia device, a streaming media device, etc.

For example, please refer to FIG. 1, which illustrates a schematic structural diagram of user equipment provided by an example of the disclosure. As shown in FIG. 1, the user equipment includes a mainboard 110, an external output/input device 120, a memory 130, an external interface 140, a touch system 150, and a power supply 160.

The mainboard 110 is integrated with processing elements such as a processor and a controller.

The external output/input device 120 may include a display component (such as a display screen), a sound playing component (such as a speaker), a sound collecting component (such as a microphone), keys, etc.

Program codes and data are stored in the memory 130.

The external interface 140 may include a headphone interface, a charging interface, a data interface, etc.

The touch system 150 may be integrated in the display components or keys of the external output/input device 120, and is configured to detect touch operations performed by a user on the display components or keys.

The power supply 160 is configured to supply power to other components in the terminal.

In the example of the disclosure, the processor in the mainboard 110 may generate interface content by executing or calling program codes and data stored in the memory, and display the generated interface content via the external output/input device 120. In the process of displaying the interface content, the capacitive touch system 150 may be used to detect the touch operations performed when the user interacts with an interface, and the external output/input device 120 may also be used to detect pressing or other operations, such as gesture operations and voice operations, performed when the user interacts with the interface.

(2) Transport Block (TB)

The transport block is the basic unit of data exchange between a physical layer and an MAC layer.

Transport block size (TBS) refers to the number of bits contained in a transport block.

Figure 2:
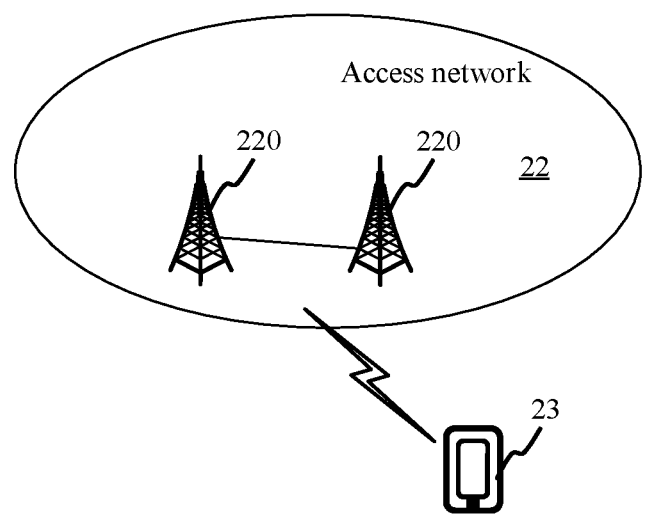
FIG. 2 is a system structure diagram of a communication system illustrated by an example of the disclosure.

FIG. 2 is a system structure diagram of a communication system according to an example of the disclosure. The example is described by taking the communication system as an MTC communication system or an NB-IoT communication system as an example. As shown in FIG. 2, the communication system may include: an access network 22 and a terminal 23.

The access network 22 includes several access network devices 220. The access network device 220 and a core network device communicate with each other via certain interface technology. For example, in the NB-IoT communication system, the access network device 220 communicates with the core network device via an interface S1. The access network devices 220 may be a base station, where the base station is an apparatus deployed in the access network to provide a wireless communication function for the terminal. In the MTC communication system, the base station is an MTC base station. In the NB-IoT communication system, the base station is an NB-IoT base station. The base station may include various forms of macro base station, micro base station, relay station, access point and so on. In systems using different radio access technologies, the names of devices with base station functions may be different, and with the evolution of communication technologies, the description of the name "base station" may change. Although a "base station" is used as an example in the examples of the disclosure, the base station may be understood as an access network device used to provide a user access function in each communication system.

The terminal 23 may include handheld devices with wireless communication functions, vehicle-mounted devices, wearable devices, computing devices or other processing devices connected to a wireless modem, as well as various forms of user equipment (UE), mobile stations (MSs), terminal devices, etc. In the example of the disclosure, the terminal 23 is an MTC terminal in the MTC communication system, or an NB-IoT terminal in the NB-IoT communication system. For example, the terminal 23 is a device deployed on a smart light pole, a device deployed on a shared bicycle, or a device deployed on a smart parking space. The examples of the disclosure do not limit the specific deployment way and device form of the terminal 23. For convenience of description, the user equipment mentioned above is collectively referred to as terminal.

Figure 3:
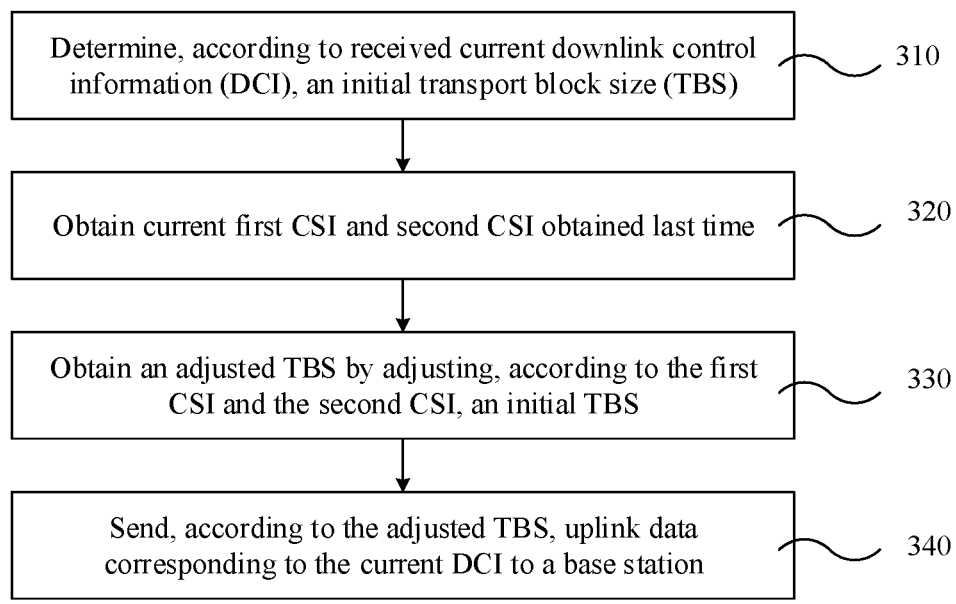
FIG. 3 is a flowchart of a method for transporting data block illustrated according to an example.

FIG. 3 is a flowchart of a method for transporting data block illustrated according to an example. The method for transporting data block is performed by a terminal. For example, the terminal may be the user equipment shown in FIG. 1. The method may be applied to the communication system shown in FIG. 2. As shown in FIG. 3, the method for transporting data block includes:

In step 310, an initial transport block size (TBS) is determined according to received current downlink control information (DCI).

A base station sends the DCI to the terminal via a physical downlink control channel (PDCCH), and the DCI includes MCS information, etc. Correspondingly, the terminal receives the DCI sent by the base station.

The TBS may be obtained by table lookup based on the number of received physical resource blocks (PRBs), namely nPRB, and an index of the TBS, namely ITBS. Or, the TBS may be determined by using formula calculation and table lookup to quantify TBSs of different sizes, thus achieving greater scheduling flexibility.

In step 320, current first CSI and second CSI obtained last time are obtained.

Channel state information (CSI) is data used to describe a channel in wireless communication. In wireless communication, the CSI represents the propagation characteristics of a communication link, which describes combined effects of scattering, fading, power attenuation and other effects in the channel. The channel state information is divided into two parts: channel state information on a transmitter side and channel state information on a receiver side according to application locations.

In the example of the disclosure, the current first channel state information (CSI) obtained by the terminal and the channel state information obtained last time refer to the channel state information on the transmitter side.

In step 330, an adjusted TBS is obtained by adjusting an initial TBS according to the first CSI and the second CSI.

A matching result is obtained by matching the obtained first CSI and second CSI. The matching result indicates that the first CSI and the second CSI are the same, or that there is a difference between the first CSI and the second CSI.

When the first CSI is the same as the second CSI, it indicates that the channel state information of the transmitter side, that is, channel state information of an uplink traffic channel, does not change.

When there is a difference between the first CSI and the second CSI, it indicates that the channel state information of the transmitter side, that is, the channel state information of the uplink traffic channel, changes.

In the example of this application, the initial TBS may be adjusted correspondingly according to the first CSI and the second CSI, so that the adjusted TBS is adapted to the current channel state information.

In step 340, uplink data corresponding to the current DCI are sent to the base station according to the adjusted TBS.

After adjusting the TBS, the terminal may send the uplink data corresponding to the current DCI to the base station according to the adjusted TBS next time, so that data block transport is adapted to the current channel state. In this way, the path loss can be reduced, and the communication quality can be improved.

For example, in a high-speed mobile scenario, when the terminal moves from a coverage center to a coverage edge at a high speed, channel state information may change accordingly, and if the uplink data is still sent according to a TBS determined by previous channel state information, the communication quality of the terminal may be seriously affected. After the TBS is adjusted according to the current channel state information, the uplink data are sent according to the adjusted TBS, so that the stability of the communication quality of the terminal can be maintained.

In a possible implementation, determining, according to the received current downlink control information (DCI), the initial transport block size (TBS) includes:

modulation and coding scheme (MCS) information in the current DCI and configuration information for transported physical resources in the current DCI are read;

initial information bits are calculated according to the MCS information and the configuration information; and the initial TBS is obtained by quantifying the initial information bits.

In a possible implementation, obtaining the adjusted TBS by adjusting, according to the first CSI and the second CSI, the initial TBS includes:

adjusted information bits are obtained by adjusting, in response to a mismatch between the first CSI and the second CSI, the initial information bits; and an adjusted TBS is obtained by quantifying the adjusted information bits.

In a possible implementation, obtaining the adjusted information bits by adjusting, in response to the mismatch between the first CSI and the second CSI, the initial information bits includes:

the initial information bits are amplified in response to a difference between the first CSI and second CSI being greater than a first threshold value;

the initial information bits are reduced in response to the difference between the first CSI and the second CSI being less than a second threshold value, the second threshold value being less than the first threshold value; and the initial information bits are maintained in response to the difference between the first CSI and the second CSI being between the first threshold value and the second threshold value.

In a possible implementation, the method further includes:

a modulation order and a coding rate are determined according to the MCS information.

Amplifying, in response to the difference between the first CSI and second CSI being greater than the first threshold value, the initial information bits includes:

the initial information bits are weighted by a first coefficient, the first coefficient being used to amplify the initial information bits;

or, the modulation order is increased by n levels, n being a positive integer;

or, the coding rate is increased by one level.

In a possible implementation, reducing, in response to the difference between the first CSI and the second CSI being less than the second threshold value, the initial information bits, the second threshold value being less than the first threshold value, includes:

the initial information bits are weighted by a second coefficient, the second coefficient being used to reduce the initial information bits;

or, the modulation order is decreased by n levels, n being a positive integer;

or, the coding rate is decreased by one level.

In a possible implementation, the method further includes:

the adjusted TBS is reported to the base station.

To sum up, in the method for transporting data block illustrated by the example of the disclosure, the terminal calculates the initial data block size according to the currently received DCI, adjusts the initial data block size according to the current channel state information of the terminal and the channel state information obtained last time, and sends the uplink data corresponding to the current DCI to the base station according to the adjusted TBS, such that the data block size fits the current channel state information of the terminal, and the communication quality of the terminal is improved.

Figure 4:
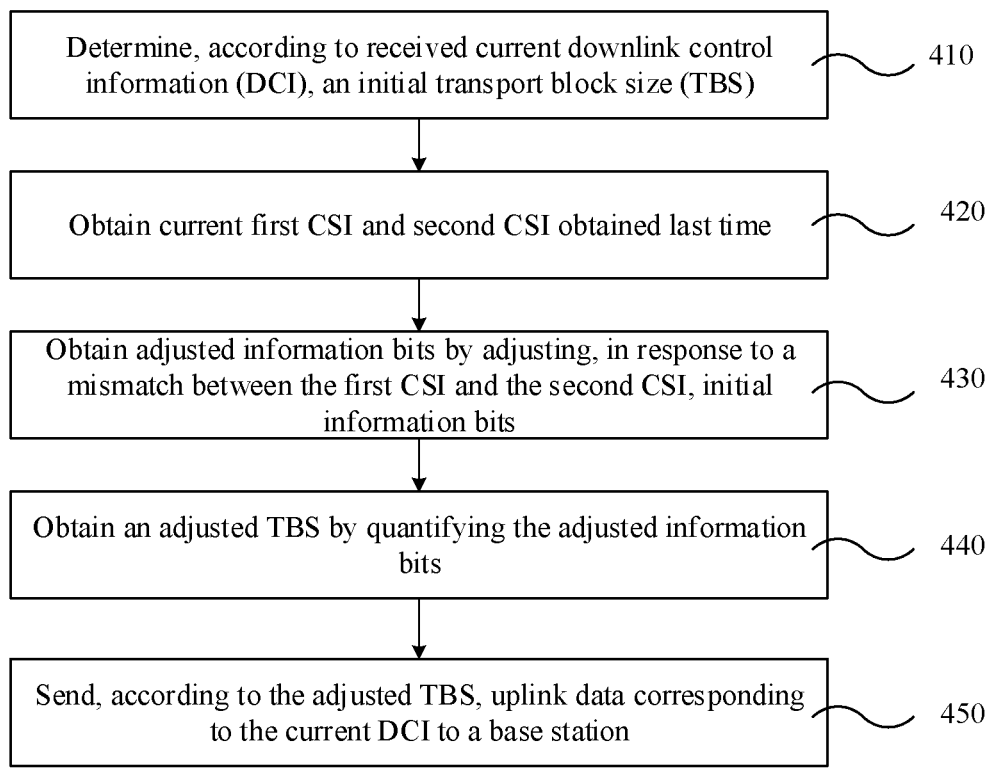
FIG. 4 is a flowchart of a method for transporting data block illustrated according to an example.

FIG. 4 is a flowchart of a method for transporting data block illustrated according to an example. The method for transporting data block is performed by a terminal. For example, the terminal may be the user equipment shown in FIG. 1. The method may be applied to the communication system shown in FIG. 2. As shown in FIG. 4, the method for transporting data block includes:

In step 410, an initial transport block size (TBS) is determined according to received current downlink control information (DCI).

Figure 5:
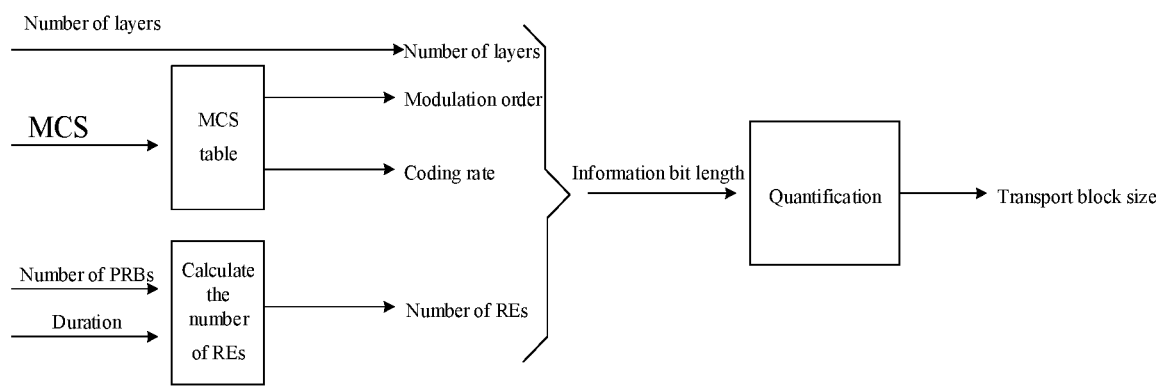
FIG. 5 illustrates a schematic diagram of calculating a transport block size illustrated according to an example of the disclosure.

FIG. 5 illustrates a schematic diagram of calculating a transport block size according to an example of the disclosure. As shown in FIG. 5, the process of calculating the TBS may be implemented as:

S411, modulation and coding scheme (MCS) information in the current DCI and configuration information for transported physical resources in the current DCI are read.

The terminal reads a "modulation and coding scheme" field of 5 bits in the current DCI, and may determine a modulation order ($Q_m$) and a coding rate (R) by table lookup after obtaining the MCS information.

The terminal reads the configuration information for the transported physical resources in the current DCI, and may obtain the total number $N_{RE}$ of resource elements (REs) that are allowed to be used for transport, and the current number of layers (V) for transport.

$N_{RE} = N_{RE}' \times n_{PRB}$, where $n_{PRB}$ is the number of allocated physical resource blocks (PRBs), and $N_{RE}'$ is the number of REs available in each PRB.

At the same time, the terminal may obtain a redundancy version (RV) by reading a "redundancy version" field in the DCI.

S412, initial information bits are calculated according to the MCS information and the configuration information.

The process of calculating the initial information bits may be implemented as:

(1) The number of REs available in each PRB allocated by a physical downlink shared channel (PDSCH) is calculated as:

$$N_{RE}' = N_{sc}^{RB} \times N_{symb}^{sh} - N_{DMRS}^{PRB} - N_{oh}^{PRB}$$

where $$N_{sc}^{RB} = 12$$

indicates the number of subcarriers contained in a PRB in the frequency domain;

$$N_{symb}^{sh}$$

indicates the number or schedulable orthogonal frequency division multiplexing (OFDM) symbols in a slot;

$$N_{DMRS}^{PRB}$$

indicates the number of REs occupied by demodulation reference signals (DM-RSs) in each PRB (including the overhead of DMRS CDM groups indicated by DCI format 1_0/1_1) within the schedulable duration; and $$N_{oh}^{PRB}$$

indicates the overhead of high-level configuration parameters Xoh-PDSCH, and if Xoh-PDSCH is not configured (with the value being one of {0, 6, 12, 18}), Xoh-PDSCH is set to be 0.

(2) The total number of REs $N_{RE}'$, that is, the number of transport resources that may be used by the terminal, is obtained by calculation based on $N_{RE}=\min(156, N_{RE}') \times n_{PRB}$ according to the calculated number of REs available in each PRB.

(3) The size of the transported information bits is determined based on a calculation formula as:

$$N_{info} = N_{RE} \cdot R \cdot Q_m \cdot V$$

where $N_{info}$ represents the size of the transported information bits, R represents the coding rate, $Q_m$ represents the modulation order, and V represents the number of layers.

S413, the initial TBS is obtained by quantifying the initial information bits.

A value closest to the above initial information bits obtained by calculation is selected according to a TBS table as the initial TBS.

In step 420, current first CSI and second CSI obtained the last time are obtained.

In step 430, adjusted information bits are obtained by adjusting, in response to a mismatch between the first CSI and the second CSI, the initial information bits.

Since the TBS is obtained by quantifying the information bits when calculated, and the TBS may change with the change of the information bits, adjusting the initial information bits refers to adjusting the TBS accordingly.

In a possible implementation, the process of adjusting the initial information bits may be implemented as follows.

(1) The initial information bits are amplified in response to a difference between the first CSI and the second CSI being greater than a first threshold value.

Since the information bits are positively correlated with the modulation order and coding rate determined according to the MCS information during the calculation process of the information bits, the information bits may be adjusted by adjusting the modulation order and the coding rate.

The process of amplifying the initial information bits may be implemented as:

the initial information bits are weighted by a first coefficient, the first coefficient being used to amplify the initial information bits.

That is, a calculation formula of the information bits is adjusted from $N_{info} = N_{RE} \cdot R \cdot Q_m \cdot V$ to $N_{info} = N_{RE} \cdot R \cdot Q_m \cdot V \cdot \alpha$, where $\alpha$ represents the first coefficient which may be greater than 1, so that the adjusted information bits may be obtained by amplifying the initial information bits.

Or, the modulation order is increased by n levels, n being a positive integer.

The modulation order is used to calculate the number of bits that each symbol of the code type can represent. For example, the numbers of bits/symbols of code types BPSK, QPSK, 8QAM, 16QAM, 32QAM etc. are log 2(2), log 2(4), log 2(8), log 2(16), log 2(32), respectively, so that modulation orders corresponding to the code types are 2, 4, 8, 16, and 32, respectively.

Increasing the modulation order by n levels may be adjusting BPSK to a level higher than BPSK, such as QPSK and 8QAM, and correspondingly the modulation order is adjusted from 2 to 4 or 8.

Or, the coding rate is increased by one level.

The coding rate may be increased by one level by directly adjusting the modulation mode or the coding rate, respectively, or by directly referring to the levels of an existing MCS table on the premise that there is room for level increase.

(2) The initial information bits are reduced in response to the difference between the first CSI and the second CSI being less than the second threshold value. The second threshold value is less than the first threshold value.

The process of amplifying the initial information bits may be implemented as:

the initial information bits are weighted by a second coefficient, the second coefficient being used to reduce the initial information bits.

That is, a calculation formula of the information bits is adjusted from $N_{info} = N_{RE} \cdot R \cdot Q_m \cdot V$ to $N_{info} = N_{RE} \cdot R \cdot Q_m \cdot V \cdot \beta$. $\beta$ represents the first coefficient which may be greater than 0 and less than 1, so that the adjusted information bits may be obtained by amplifying the initial information bits.

Or, the modulation order is decreased by n levels, n being a positive integer.

Decreasing the modulation order by n levels may be adjusting 32QAM to a level lower than 32QAM, such as 16QAM and 8QAM, and correspondingly the modulation order is adjusted from 32 to 16 or 8.

Or, the coding rate is decreased by one level.

The coding rate may be decreased by one level by directly adjusting the modulation mode or the coding rate, respectively, or by directly referring to the levels of the existing MCS table on the premise that there is room for level decrease.

(3) The initial information bits are maintained in response to the difference between the first CSI and the second CSI being between the first threshold value and the second threshold value.

In step 440, an adjusted TBS is obtained by quantifying the adjusted information bits.

According to a TBS table, a value closest to the adjusted information bits is selected as the adjusted TBS.

In step 450, uplink data corresponding to the current DCI is sent to a base station according to the adjusted TBS.

In a possible implementation, the method further includes:

the adjusted TBS is reported to the base station.

After adjusting the TBS, the terminal can notify the base station of the adjustment on the TBS, so that the base station can perform corresponding processing according to the adjustment made by the terminal on the TBS. In this way, in a transmission process of the uplink data, the base station can receive the uplink data sent by the terminal according to the adjusted TBS.

In a possible implementation, the terminal may notify the base station of adjustment on the TBS via uplink signaling, and the uplink signaling may be carried in an uplink control channel of the terminal in the same time slot of an uplink traffic channel.

To sum up, in the method for transporting data block illustrated by the example of the disclosure, the terminal calculates the initial data block size according to the currently received DCI, adjusts the initial data block size according to the current channel state information of the terminal and the channel state information obtained last time, and sends the uplink data corresponding to the current DCI to the base station according to the adjusted TBS, such that the data block size fits the current channel state information of the terminal, and the communication quality of the terminal is improved.

Figure 6:
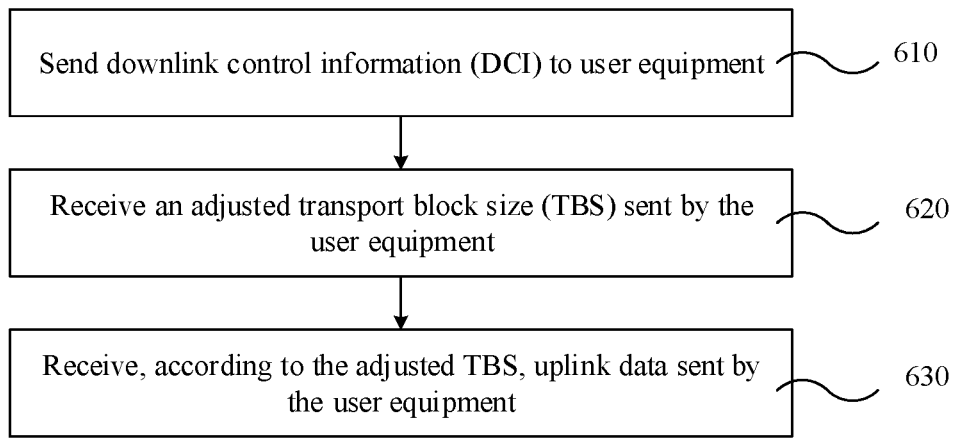
FIG. 6 is a flowchart of a method for transporting data block illustrated according to an example.

As for a base station side, the base station can perform corresponding processing according to the adjustment made by the TBS on the terminal. FIG. 6 is a flowchart of a method for transporting data block illustrated according to an example. The method for transporting data block is performed by the base station. The base station may be the access network device in the communication system shown in FIG. 2. As shown in FIG. 6, the method for transporting data block includes:

In step 610, downlink control information (DCI) is sent to user equipment.

In step 620, an adjusted transport block size (TBS) sent by the user equipment is received, the adjusted TBS being obtained by the user equipment after adjusting, according to first channel state information (CSI) obtained currently and second channel state information (CSI) obtained last time, an initial TBS determined according to the DCI.

In step 630, uplink data sent by the user equipment is received according to the adjusted TBS, the uplink data corresponding to the DCI.

Step 630, uplink data sent by the user equipment is received according to the adjusted TBS, the uplink data corresponding to the DCI.

The process of adjusting the TBS by the terminal may refer to the relevant description of the example shown in FIG. 3 or FIG. 4, which will not be repeated here.

The process that the terminal sends the adjusted TBS to the base station so that the base station can receive the uplink data sent by the terminal according to the adjusted TBS is called an explicit method.

The terminal may notify the base station of adjustment on the TBS via uplink signaling, and the uplink signaling may be carried in an uplink control channel of the terminal in the same time slot of an uplink traffic channel. Accordingly, the base station may obtain the adjusted TBS by receiving the uplink signaling carried in the uplink control channel of the terminal in the same time slot of the channel traffic channel.

To sum up, in the method for transporting data block illustrated by the example of the disclosure, the base station can receive the uplink data sent by the terminal according to the received TBS adjusted by the terminal, and the terminal calculates the initial data block size according to the currently received DCI, adjusts the initial data block size according to the current channel state information of the terminal and the channel state information obtained last time, and sends the uplink data corresponding to the current DCI to the base station according to the adjusted TBS, such that the data block size fits the current channel state information of the terminal, and the communication quality of the terminal is improved.

Figure 7:
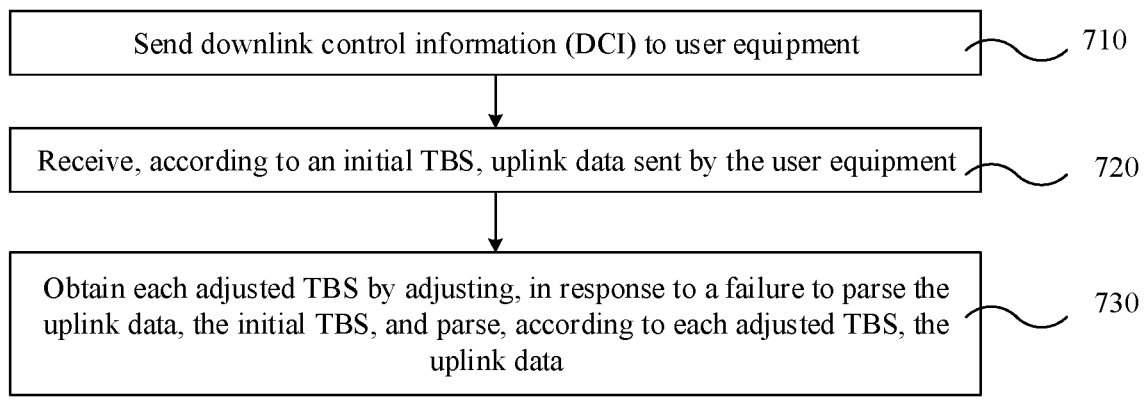
FIG. 7 illustrates a flowchart of a method for transporting data block illustrated according to an example of the disclosure.

Or, in another possible implementation, please refer to FIG. 7, which illustrates a flowchart of a method for transporting data block illustrated according to an example of the disclosure. The method for transporting data block is performed by a base station. The base station may be an access network device in the communication system shown in FIG. 2. As shown in FIG. 7, the method for transporting data block includes:

in step 710, downlink control information (DCI) is sent to user equipment;

in step 720, uplink data sent by the user equipment is received according to an initial TBS, the initial TBS being determined according to the DCI; and in step 730, each adjusted TBS is obtained by adjusting, in response to a failure to parse the uplink data, the initial TBS, and the uplink data is parsed according to each adjusted TBS;

In the above process, after receiving the uplink data sent by the terminal, the base station first performs rate matching and cyclic redundancy check (CRC) correction on the uplink data according to the initial TBS information. In response to CRC check errors, that is, the failure to parse the uplink data, the base station may perform rate matching and CRC correction according to TBS changes caused by possible adjustment methods of the TBS, modulation and coding method changes, etc., so as to adjust the initial TBS. The uplink data is parsed according to each adjusted TBS until the uplink data is successfully parsed.

In a possible case, the base station cannot parse the uplink data according to each adjusted TBS, which indicates that CRC under all possible conditions is incorrect so that the uplink data are judged to be illegal and discarded.

In the example of this application, the terminal does not send the adjusted TBS to the base station, and sends the uplink data to the base station according to the adjusted TBS, and the process that the base station receives and parses the uplink data via blind detection is called an implicit method.

To sum up, in the method for transporting data block illustrated by the example of the disclosure, the base station can adjust the TBS based on the received uplink data. The terminal calculates the initial data block size according to the currently received DCI, adjusts the initial data block size according to the current channel state information of the terminal and the channel state information obtained the last time, and sends the uplink data corresponding to the current DCI to the base station according to the adjusted TBS, such that the data block size fits the current channel state information of the terminal, and the communication quality of the terminal is improved.

Figure 8:
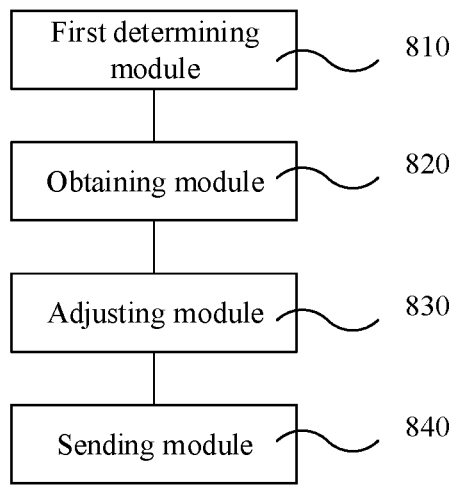
FIG. 8 is a structural block diagram of a data block transport apparatus illustrated according to an example.

FIG. 8 is a structural block diagram of a data block transport apparatus illustrated according to an example. The data block transport apparatus is applied to a terminal to perform all or part of the steps of the above method example shown in FIG. 3 or FIG. 4. The above terminal may be user equipment as shown in FIG. 1. As shown in FIG. 8, the data block transport apparatus may include:

a first determining module 810, configured to determine, according to received current downlink control information (DCI), an initial transport block size (TBS);

an obtaining module 820, configured to obtain current first channel state information (CSI) and second channel state information (CSI) obtained last time;

an adjusting module 830, configured to obtain an adjusted TBS by adjusting, according to the first CSI and the second CSI, the initial TBS; and a sending module 840, configured to send, according to the adjusted TBS, uplink data corresponding to the current DCI to a base station.

In a possible implementation, the first determining module 810 includes:

a reading sub-module, configured to read modulation and coding scheme (MCS) information in the current DCI and configuration information for transported physical resources in the current DCI;
  a calculating sub-module, configured to calculate, according to the MCS information and the configuration information, initial information bits; and
  a first quantifying sub-module, configured to obtain the initial TBS by quantifying the initial information bits.

In a possible implementation, the adjusting module 830 includes:
  a first adjusting sub-module, configured to obtain adjusted information bits by adjusting, in response to a mismatch between the first CSI and the second CSI, the initial information bits; and
  a second quantifying sub-module, configured to obtain the adjusted TBS by quantifying the adjusted information bits.

In a possible implementation, the first adjusting sub-module includes:
  a first adjusting unit, configured to amplify, in response to a difference between the first CSI and the second CSI being greater than a first threshold value, the initial information bits;
  a second adjusting unit, configured to reduce, in response to the difference between the first CSI and the second CSI being less than a second threshold value, the initial information bits, the second threshold value being less than the first threshold value; and
  a third adjusting unit, configured to maintain, in response to the difference between the first CSI and the second CSI being between the first threshold value and the second threshold value, the initial information bits.

In a possible implementation, the apparatus further includes:
  a second determining module, configured to determine, according to the MCS information, a modulation order and a coding rate.

The first adjusting unit is configured to:
  weight the initial information bits by a first coefficient, the first coefficient being used to amplify the initial information bits;
  or,
  increase the modulation order by n levels, n being a positive integer;
  or,
  increase the coding rate by one level.

In a possible implementation, the second adjusting unit is configured to:
  weight the initial information bits by a second coefficient, the second coefficient being used to reduce the initial information bits;
  or,
  decrease the modulation order by n levels, n being a positive integer;
  or,
  decrease the coding rate by one level.

In a possible implementation, the apparatus further includes:
  a reporting module, configured to report the adjusted TBS to the base station.

To sum up, the data block transport apparatus illustrated by the example of the disclosure is applied to the terminal. In this way, the terminal calculates the initial data block size according to the currently received DCI, adjusts the initial data block size according to the current channel state information of the terminal and the channel state information obtained the last time, and sends the uplink data corresponding to the current DCI to the base station according to the adjusted TBS, such that the data block size fits the current channel state information of the terminal, and the communication quality of the terminal is improved.

Figure 9:
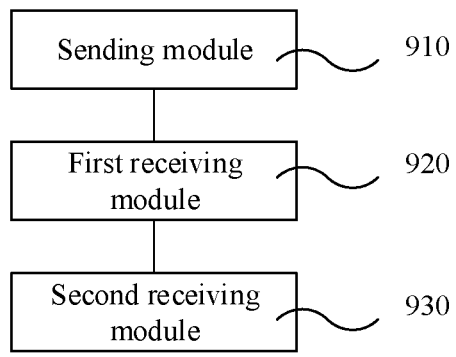
FIG. 9 is a structural block diagram of a data block transport apparatus illustrated according to an example.

FIG. 9 is a structural block diagram of a data block transport apparatus illustrated according to an example. The data block transport apparatus is applied to a base station to perform all or part of the steps of the above method example shown in FIG. 6. The above base station may be an access network device as shown in FIG. 2. As shown in FIG. 9, the data block
  a sending module 910, configured to send downlink control information (DCI) to user equipment;
  a first receiving module 920, configured to receive an adjusted transport block size (TBS) sent by the user equipment, the adjusted TBS being obtained by the user equipment after adjusting, according to first channel state information (CSI) obtained currently and second channel state information (CSI) obtained last time, an initial TBS determined according to the DCI; and
  a second receiving module 930, configured to receive, according to the adjusted TBS, uplink data sent by the user equipment, the uplink data corresponding to the DCI.

To sum up, the data block transport apparatus illustrated by the example of the disclosure is applied to the base station. In this way, the base station can receive the uplink data sent by the terminal according to the received TBS adjusted by the terminal. The terminal calculates the initial data block size according to the currently received DCI, adjusts the initial data block size according to the current channel state information of the terminal and the channel state information obtained the last time, and sends the uplink data corresponding to the current DCI to the base station according to the adjusted TBS, such that the data block size fits the current channel state information of the terminal, and the communication quality of the terminal is improved.

Figure 10:
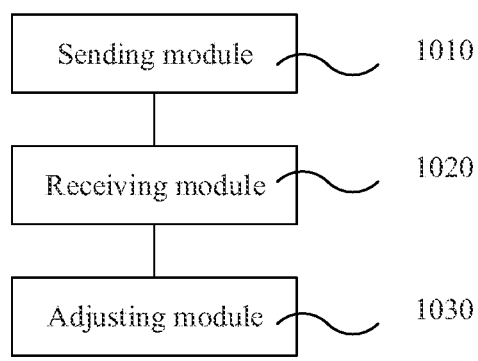
FIG. 10 is a structural block diagram of a data block transport apparatus illustrated according to an example.

FIG. 10 is a structural block diagram of a data block transport apparatus illustrated according to an example. The data block transport apparatus is applied to a base station to perform all or part of the steps of the above method example shown in FIG. 7. The above base station may be an access network device as shown in FIG. 2. As shown in FIG. 10, the data block
  a sending module 1010, configured to send downlink control information (DCI) to user equipment;
  a receiving module 1020, configured to receive, according to an initial TBS, uplink data sent by the user equipment, the initial TBS being determined according to the DCI; and
  an adjusting module 1030, configured to obtain each adjusted TBS by adjusting, in response to a failure to parse the uplink data, the initial TBS, and parse, according to each adjusted TBS, the uplink data.

To sum up, the data block transport apparatus shown in the example of the disclosure is applied to the base station. In this way, the base station can adjust the TBS based on the received uplink data. The terminal calculates the initial data block size according to the currently received DCI, adjusts the initial data block size according to the current channel state information of the terminal and the channel state information obtained the last time, and sends the uplink data corresponding to the current DCI to the base station according to the adjusted TBS, such that the data block size fits the current channel state information of the terminal, and the communication quality of the terminal is improved.

Figure 11:
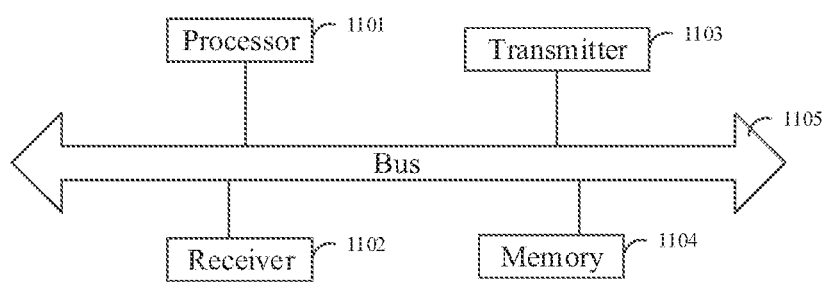
FIG. 11 illustrates a schematic structural diagram of a terminal provided by an example of the disclosure.

FIG. 11 illustrates a schematic structural diagram of a terminal provided by an example of the disclosure. The terminal includes: a processor 1101, a receiver 1102, a transmitter 1103, a memory 1104, and a bus 1105.

The processor 1101 includes one or more processing cores. The processor 1101 executes functional applications and information processing by running software programs and modules.

The receiver 1102 and the transmitter 1103 may be implemented as one communication component, which may be a communication chip.

The memory 1104 is connected to the processor 1101 via the bus 1105.

The memory 1104 may be configured to store at least one instruction, and the processor 1101 may be configured to execute the at least one instruction to implement steps in the above method examples.

In addition, the memory 1104 may be implemented by any type or combination of volatile or non-volatile storage devices including, but not limited to, a magnetic or compact disk, an electrically-erasable and programmable read-only memory (EEPROM), an erasable programmable read-only memory (EPROM), a static random-access memory (SRAM), a read-only memory (ROM), a magnetic memory, a flash memory, a programmable read-only memory (PROM).

In an example, a computer-readable storage medium is further provided. The computer-readable storage medium stores at least one instruction, at least one program, and a code set or instruction set. The at least one instruction, the at least one program, and the code set or instruction set are loaded and executed by the processor to implement the transport block transport method with the terminal as a subject of execution in each of the above method examples.

Figure 12:
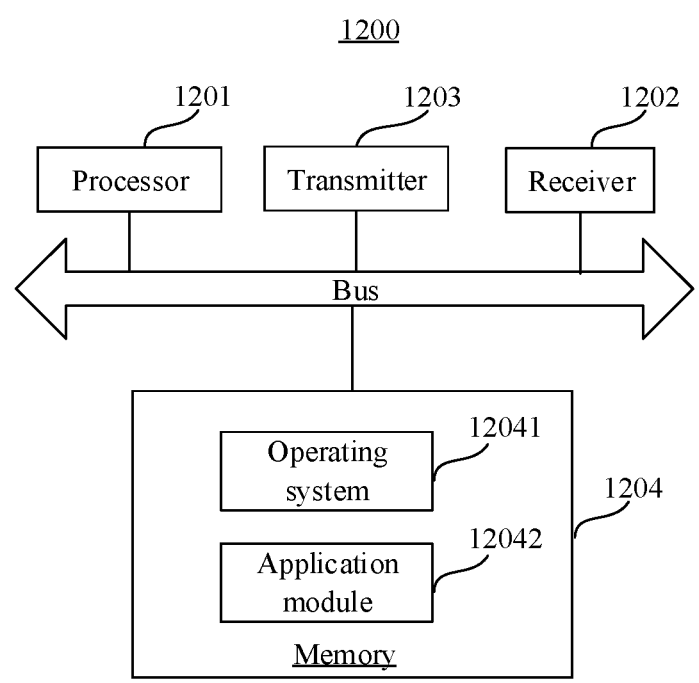
FIG. 12 is a schematic structural diagram of an access network device (base station) provided by an example.

FIG. 12 is a schematic structural diagram of an access network device (base station) provided by an example.

The access network device 1200 may include: a processor 1201, a receiver 1202, a transmitter 1203, and a memory 1204. The receiver 1202, the transmitter 1203, and the memory 1204 are each connected to the processor 1201 via a bus.

The processor 1201 includes one or more processing cores. The processor 1201 executes a method performed by the access network device in the transport block scheduling method provided by the example of the disclosure by running software programs and modules. The memory 1204 may be configured to store the software programs and the modules. Specifically, the memory 1204 may store an operating system 12041 and an application module 12042 needed for at least one function. The receiver 1202 is configured to receive communication data sent by other devices, and the transmitter 1203 is configured to send communication data to other devices.

In an example, a computer-readable storage medium is further provided. The computer-readable storage medium stores at least one instruction, at least one program, a code set or instruction set. The at least one instruction, the at least one program, the code set or instruction set are loaded and executed by the processor to implement the method for transporting data block with the base station as a subject of execution in each of the above method examples.

The technical solution provided by the examples of the disclosure may include the following beneficial effects:
the terminal calculates the initial data block size according to the currently received downlink control information (DCI), adjusts the initial data block size according to the current channel state information of the terminal and the channel state information obtained last time, and sends the uplink data corresponding to the current DCI to the base station according to the adjusted TBS, such that the data block size fits the current channel state information of the terminal, and the communication quality of the terminal is improved.

Other implementations of the disclosure will be apparent to those skilled in the art from consideration of the specification and practice of the disclosure herein. The disclosure is intended to cover any variations, uses, or adaptations of the disclosure following the general principles of the disclosure and including such departures from the disclosure as come within known or customary practice in the art. It is intended that the specification and examples be considered as examples merely.

It will be appreciated that the disclosure is not limited to the exact construction that has been described above and illustrated in the accompanying drawings, and that various modifications and changes may be made without departing from the scope of the disclosure.

Additional non-limiting examples of the disclosure include:

According to a first aspect of examples of the disclosure, a method for transporting data block is provided, and includes:
 determining, according to received current downlink control information (DCI), an initial transport block size (TBS);
 obtaining current first channel state information (CSI) and second CSI obtained last time;
 obtaining an adjusted TBS by adjusting, according to the first CSI and the second CSI, the initial TBS; and
 sending, according to the adjusted TBS, uplink data corresponding to the current DCI to a base station.

In the above solution, determining, according to the received current downlink control information (DCI), the initial transport block size (TBS) includes:
 reading modulation and coding scheme (MCS) information in the current DCI and configuration information for transported physical resources in the current DCI;
 calculating, according to the MCS information and the configuration information, initial information bits; and
 obtaining the initial TBS by quantifying the initial information bits.

In the above solution, obtaining the adjusted TBS by adjusting, according to the first CSI and the second CSI, the initial TBS includes:
 obtaining adjusted information bits by adjusting, in response to a mismatch between the first CSI and the second CSI, the initial information bits; and
 obtaining the adjusted TBS by quantifying the adjusted information bits.

In the above solution, obtaining the adjusted information bits by adjusting, in response to the mismatch between the first CSI and the second CSI, the initial information bits includes:
 amplifying, in response to a difference between the first CSI and the second CSI being greater than a first threshold value, the initial information bits;
 reducing, in response to the difference between the first CSI and the second CSI being less than a second threshold value, the initial information bits, the second threshold value being less than the first threshold value; and
 maintaining, in response to the difference between the first CSI and the second CSI being between the first threshold value and the second threshold value, the initial information bits.

In the above solution, the method further includes:
determining, according to the MCS information, a modulation order and a coding rate.

Amplifying, in response to the difference between the first CSI and the second CSI being greater than the first threshold value, the initial information bits includes:
weighting the initial information bits by a first coefficient, the first coefficient being used to amplify the initial information bits;
or,
increasing the modulation order by n levels, n being a positive integer;
or,
increasing the coding rate by one level.

In the above solution, reducing, in response to the difference between the first CSI and the second CSI being less than the second threshold value, the initial information bits, the second threshold value being less than the first threshold value, includes:
weighting the initial information bits by a second coefficient, the second coefficient being used to reduce the initial information bits;
or,
decreasing the modulation order by n levels, n being a positive integer;
or,
decreasing the coding rate by one level.

In the above solution, the method further includes:
reporting the adjusted TBS to the base station.

According to a second aspect of examples of the disclosure, a method for transporting data block is provided, and includes:
sending downlink control information (DCI) to user equipment;
receiving an adjusted transport block size (TBS) sent by the user equipment, the adjusted TBS being obtained by the user equipment after adjusting, according to first channel state information (CSI) obtained currently and second channel state information (CSI) obtained last time, an initial TBS determined according to the DCI; and
receiving, according to the adjusted TBS, uplink data sent by the user equipment, the uplink data corresponding to the DCI.

According to a third aspect of examples of the disclosure, a method for transporting data block is provided, and includes:
sending downlink control information (DCI) to user equipment;
receiving, according to an initial TBS, uplink data sent by the user equipment, the initial TBS being determined according to the DCI; and
obtaining each adjusted TBS by adjusting, in response to a failure to parse the uplink data, the initial TBS, and parsing, according to each adjusted TBS, the uplink data.

According to a fourth aspect of examples of the disclosure, an apparatus for transporting data block is provided, and includes:
a first determining module, configured to determine, according to received current downlink control information (DCI), an initial transport block size (TBS);
an obtaining module, configured to obtain current first channel state information (CSI) and second channel state information (CSI) obtained last time;
an adjusting module, configured to obtain an adjusted TBS by adjusting, according to the first CSI and the second CSI, the initial TBS; and
a sending module, configured to send, according to the adjusted TBS, uplink data corresponding to the current DCI to a base station.

In the above solution, the first determining module includes:
a reading sub-module, configured to read modulation and coding scheme (MCS) information in the current DCI and configuration information for transported physical resources in the current DCI;
a calculating sub-module, configured to calculate, according to the MCS information and the configuration information, initial information bits; and
a first quantifying sub-module, configured to obtain the initial TBS by quantifying the initial information bits.

In the above solution, the adjusting module includes:
a first adjusting sub-module, configured to obtain adjusted information bits by adjusting, in response to a mismatch between the first CSI and the second CSI, the initial information bits; and
a second quantifying sub-module, configured to obtain the adjusted TBS by quantifying the adjusted information bits.

In the above solution, the first adjusting sub-module includes:
a first adjusting unit, configured to amplify, in response to a difference between the first CSI and the second CSI being greater than a first threshold value, the initial information bits;
a second adjusting unit, configured to reduce, in response to the difference between the first CSI and the second CSI being less than a second threshold value, the initial information bits, the second threshold value being less than the first threshold value; and
a third adjusting unit, configured to maintain, in response to the difference between the first CSI and the second CSI being between the first threshold value and the second threshold value, the initial information bits.

In the above solution, the apparatus further includes:
a second determining module, configured to determine, according to the MCS information, a modulation order and a coding rate.

The first adjusting unit is configured to:
weight the initial information bits by a first coefficient, the first coefficient being used to amplify the initial information bits;
or,
increase the modulation order by n levels, n being a positive integer;
or,
increase the coding rate by one level.

In the above solution, the second adjusting unit is configured to:
weight the initial information bits by a second coefficient, the second coefficient being used to reduce the initial information bits;
or,
decrease the modulation order by n levels, n being a positive integer;
or,
decrease the coding rate by one level.

In the above solution, the apparatus further includes:
a reporting module, configured to report the adjusted TBS to the base station.

According to a fifth aspect of examples of the disclosure, an apparatus for transporting data block is provided, and includes:
- a sending module, configured to send downlink control information (DCI) to user equipment;
- a first receiving module, configured to receive an adjusted transport block size (TBS) sent by the user equipment, the adjusted TBS being obtained by the user equipment after adjusting, according to first channel state information (CSI) obtained currently and second channel state information (CSI) obtained last time, an initial TBS determined according to the DCI; and
- a second receiving module, configured to receive, according to the adjusted TBS, uplink data sent by the user equipment, the uplink data corresponding to the DCI.

According to a sixth aspect of examples of the disclosure, an apparatus for transporting data block is provided, and includes.
- a sending module, configured to send downlink control information (DCI) to user equipment;
- a receiving module, configured to receive, according to an initial TBS, uplink data sent by the user equipment, the initial TBS being determined according to the DCI; and
- an adjusting module, configured to obtain each adjusted TBS by adjusting, in response to a failure to parse the uplink data, the initial TBS, and parse, according to each adjusted TBS, the uplink data.

According to a seventh aspect of examples of the disclosure, a terminal is provided, and includes:
- a processor;
- a transceiver connected to the processor; and
- a memory configured to store processor-executable instructions.

The processor is configured to:
- determine, according to received current downlink control information (DCI), an initial transport block size (TBS);
- obtain current first channel state information (CSI) and second channel state information (CSI) obtained last time;
- obtain an adjusted TBS by adjusting, according to the first CSI and the second CSI, the initial TBS; and
- send, according to the adjusted TBS, uplink data corresponding to the current DCI to a base station.

In the above solution, determining, according to the received current downlink control information (DCI), the initial transport block size (TBS) includes:
- reading modulation and coding scheme (MCS) information in the current DCI and configuration information for transported physical resources in the current DCI;
- calculating, according to the MCS information and the configuration information, initial information bits; and
- obtaining the initial TBS by quantifying the initial information bits.

In the above solution, obtaining the adjusted TBS by adjusting, according to the first CSI and the second CSI, the initial TBS includes:
- obtaining adjusted information bits by adjusting, in response to a mismatch between the first CSI and the second CSI, the initial information bits; and
- obtaining the adjusted TBS by quantifying the adjusted information bits.

In the above solution, obtaining the adjusted information bits by adjusting, in response to the mismatch between the first CSI and the second CSI, the initial information bits includes:
- amplifying, in response to a difference between the first CSI and the second CSI being greater than a first threshold value, the initial information bits;
- reducing, in response to the difference between the first CSI and the second CSI being less than a second threshold value, the initial information bits, the second threshold value being less than the first threshold value; and
- maintaining, in response to the difference between the first CSI and the second CSI being between the first threshold value and the second threshold value, the initial information bits.

In the above solution, the method further includes:
- determining, according to the MCS information, a modulation order and a coding rate.

Amplifying, in response to the difference between the first CSI and the second CSI being greater than the first threshold value, the initial information bits includes:
- weighting the initial information bits by a first coefficient, the first coefficient being used to amplify the initial information bits;
- or,
- increasing the modulation order by n levels, n being a positive integer;
- or,
- increasing the coding rate by one level.

In the above solution, reducing, in response to the difference between the first CSI and the second CSI being less than the second threshold value, the initial information bits, the second threshold value being less than the first threshold value, includes:
- weighting the initial information bits by a second coefficient, the second coefficient being used to reduce the initial information bits;
- or,
- decreasing the modulation order by n levels, n being a positive integer;
- or,
- decreasing the coding rate by one level.

In the above solution, the method further includes:
reporting the adjusted TBS to the base station.

According to an eighth aspect of examples of the disclosure, a base station is provided, and includes:
- a processor;
- a transceiver connected to the processor; and
- a memory configured to store processor-executable instructions.

The processor is configured to:
- send downlink control information (DCI) to user equipment;
- receive an adjusted transport block size (TBS) sent by the user equipment, the adjusted TBS being obtained by the user equipment after adjusting, according to first channel state information (CSI) obtained currently and second channel state information (CSI) obtained last time, an initial TBS determined according to the DCI; and
- receive, according to the adjusted TBS, uplink data sent by the user equipment, the uplink data corresponding to the DCI.

According to a ninth aspect of examples of the disclosure, a base station is provided, and includes:
- a processor;
- a transceiver connected to the processor; and
- a memory configured to store processor-executable instructions.

The processor is configured to:
send downlink control information (DCI) to user equipment;
receive, according to an initial TBS, uplink data sent by the user equipment, the initial TBS being determined according to the DCI; and
obtain each adjusted TBS by adjusting, in response to a failure to parse the uplink data, the initial TBS, and parse, according to each adjusted TBS, the uplink data.

According to a tenth aspect of examples of the disclosure, a computer-readable storage medium is provided. The computer-readable storage medium stores at least one instruction, at least one program, a code set or instruction set, and the at least one instruction, the at least one program, the code set or instruction set are loaded and executed by a processor to implement the method for transporting data block according to the first aspect or any optional scheme of the first aspect.

The invention claimed is:

1. A method for transporting data block, performed by a user equipment (UE), comprising:
reading modulation and coding scheme (MCS) information in a current downlink control information (DCI) and configuration information for transported physical resources in the current DCI;
calculating, according to the MCS information and the configuration information, initial information bits;
obtaining an initial transport block size (TBS) by quantifying the initial information bits;
obtaining current first channel state information (CSI) and second CSI obtained last time;
obtaining an adjusted TBS by adjusting, according to the first CSI and the second CSI, the initial TBS; and
sending, according to the adjusted TBS, uplink data corresponding to the current DCI to a base station.

2. The method according to claim 1, wherein obtaining the adjusted TBS by adjusting, according to the first CSI and the second CSI, the initial TBS comprises:
obtaining adjusted information bits by adjusting, in response to a mismatch between the first CSI and the second CSI, the initial information bits; and
obtaining the adjusted TBS by quantifying the adjusted information bits.

3. The method according to claim 2, wherein obtaining the adjusted information bits by adjusting, in response to the mismatch between the first CSI and the second CSI, the initial information bits comprises:
amplifying, in response to a difference between the first CSI and the second CSI being greater than a first threshold value, the initial information bits;
reducing, in response to a difference between the first CSI and the second CSI being less than a second threshold value, the initial information bits, the second threshold value being less than a first threshold value; or
maintaining, in response to a difference between the first CSI and the second CSI being between a first threshold value and a second threshold value, the initial information bits.

4. The method according to claim 3, further comprising:
determining, according to the MCS information, a modulation order and a coding rate, wherein
amplifying, in response to the difference between the first CSI and the second CSI being greater than the first threshold value, the initial information bits comprises:
weighting the initial information bits by a first coefficient, the first coefficient being used to amplify the initial information bits.

5. The method according to claim 3, further comprising:
determining, according to the MCS information, a modulation order and a coding rate, wherein
reducing, in response to the difference between the first CSI and the second CSI being less than the second threshold value, the initial information bits, the second threshold value being less than the first threshold value, comprises:
weighting the initial information bits by a second coefficient, the second coefficient being used to reduce the initial information bits.

6. The method according to claim 3, further comprising:
determining, according to the MCS information, a modulation order and a coding rate, wherein
amplifying, in response to the difference between the first CSI and the second CSI being greater than the first threshold value, the initial information bits comprises:
increasing the modulation order by n levels, n being a positive integer.

7. The method according to claim 3, further comprising:
determining, according to the MCS information, a modulation order and a coding rate, wherein
amplifying, in response to the difference between the first CSI and the second CSI being greater than the first threshold value, the initial information bits comprises:
increasing the coding rate by one level.

8. The method according to claim 3, further comprising:
determining, according to the MCS information, a modulation order and a coding rate, wherein
reducing, in response to the difference between the first CSI and the second CSI being less than the second threshold value, the initial information bits, the second threshold value being less than the first threshold value, comprises:
decreasing the modulation order by n levels, n being a positive integer.

9. The method according to claim 3, further comprising:
determining, according to the MCS information, a modulation order and a coding rate, wherein
reducing, in response to the difference between the first CSI and the second CSI being less than the second threshold value, the initial information bits, the second threshold value being less than the first threshold value, comprises:
decreasing the coding rate by one level.

10. The method according to claim 1, further comprising:
reporting the adjusted TBS to the base station.

11. A method for transporting data block, performed by a base station, the method comprising:
sending downlink control information (DCI) to user equipment, wherein the DCI comprises modulation and coding scheme (MCS) information and configuration information for transported physical resources;
receiving an adjusted transport block size (TBS) sent by the user equipment, wherein the adjusted TBS is obtained by the user equipment after quantifying adjusted information bits, the adjusted information bits are obtained by the user equipment adjusting initial information bits in response to a mismatch between first channel state information (CSI) obtained currently and second CSI obtained last time, and the initial information bits are calculated by the user equipment based on the MCS information and the configuration information; and
receiving, according to the adjusted TBS, uplink data sent by the user equipment, the uplink data corresponding to the DCI.

12. The method according to claim 11, wherein receiving the adjusted TBS sent by the user equipment comprises:

obtaining the adjusted TBS by receiving uplink signaling carried in an uplink control channel of the user equipment in a same time slot of a channel traffic channel.

13. A method for transporting data block, performed by base station, the method comprising:

sending downlink control information (DCI) to user equipment, wherein the DCI comprises modulation and coding scheme (MCS) information and configuration information for transported physical resources;

receiving, according to an initial transport block size (TBS), uplink data sent by the user equipment, wherein the initial TBS is obtained by the user equipment quantifying initial information bits, and the initial information bits are calculated by the user equipment based on the MCS information and the configuration information; and obtaining each adjusted TBS by adjusting, in response to a failure to parse the uplink data, the initial TBS, and parsing, according to each adjusted TBS, the uplink data.

14. A user equipment, comprising:

one or more processors;

a transceiver connected to the one or more processors; and a memory configured to store processor-executable instructions, wherein the one or more processors are collectively configured to implement the method for transporting data block according to claim 1 when executing the processor-executable instructions.

15. A base station, comprising:

one or more processors;

a transceiver connected to the one or more processors; and a memory configured to store processor-executable instructions, wherein the one or more processors are collectively configured to implement the method for transporting data block according to claim 11 when executing the processor-executable instructions.

16. A base station, comprising:

one or more processors;

a transceiver connected to the one or more processors; and a memory configured to store processor-executable instructions, wherein the one or more processors are collectively configured to implement the method for transporting data block according to claim 13 when executing the processor-executable instructions.

17. A non-transitory computer-readable storage medium, wherein the non-transitory computer-readable storage medium stores at least one instruction, at least one program, a code set or instruction set, and the at least one instruction, the at least one program, the code set or instruction set are loaded and executed by one or more processors to implement the method for transporting data block according to claim 1.

18. A non-transitory computer-readable storage medium, wherein the non-transitory computer-readable storage medium stores at least one instruction, at least one program, a code set or instruction set, and the at least one instruction, the at least one program, the code set or instruction set are loaded and executed by one or more processors to implement the method for transporting data block according to claim 11.

19. A non-transitory computer-readable storage medium, wherein the non-transitory computer-readable storage medium stores at least one instruction, at least one program, a code set or instruction set, and the at least one instruction, the at least one program, the code set or instruction set are loaded and executed by one or more processors to implement the method for transporting data block according to claim 13.

* * * * *